（12）United States Patent
Magnell et al.

(10) Patent No.: US 11,981,007 B2
(45) Date of Patent: May 14, 2024

(54) NAIL PLATE INSTALLATION SYSTEM (71) Applicants: Mikel W. Magnell, Glyndon, MN (US); Peter A. Ihle, Horace, ND (US)

(72) Inventors: Mikel W. Magnell, Glyndon, MN (US); Peter A. Ihle, Horace, ND (US)

( * ) Notice: Subject to any disclaimer, the term of this patent is extended or adjusted under 35 U.S.C. 154(b) by 482 days.

(21) Appl. No.: 17/317,023

(22) Filed: May 11, 2021

(65) Prior Publication Data

US 2022/0362913 A1 Nov. 17, 2022

(51) Int. Cl.
*B25C 3/00* (2006.01)
*F16B 15/00* (2006.01)

(52) U.S. Cl.
CPC .......... *B25C 3/006* (2013.01); *F16B 15/0046* (2013.01)

(58) Field of Classification Search
CPC .............. B25D 1/14; B25D 1/06; B25C 3/006
See application file for complete search history.

(56) References Cited

U.S. PATENT DOCUMENTS

| | | | |
|---|---|---|---|
| 9,332,872 B1* | 5/2016 | Eldridge | A47G 27/0487 |
| 2013/0126807 A1* | 5/2013 | Lombardi | B25D 1/04 |
| | | | 254/26 R |
| 2021/0094162 A1* | 4/2021 | Harper | B25D 1/06 |
| 2022/0362913 A1* | 11/2022 | Magnell | F16B 15/0046 |

* cited by examiner

*Primary Examiner* — Lee D Wilson
(74) *Attorney, Agent, or Firm* — Neustel Law Offices (57) ABSTRACT A nail plate driving system for safely and efficiently installing nail plates at various heights. A first handle having an engaging head removably receives a second handle having a magnet. The magnet of the second handle is configured to magnetically secure a metal nail plate to allow a user to position the nail plate in a desired location on a wood member to be striked by the engaging head of the first handle. After the nail plate is secured to the wood member the magnet is removed from the nail plate and the process is repeated with the next nail plate. When not in use, the second handle may be secured within the first handle.

27 Claims, 9 Drawing Sheets

NAIL PLATE INSTALLATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to nail plate driving devices for safely and efficiently installing nail plates at various heights.

During construction or remodeling of a building, nail plates are used to protect electrical wiring, water lines, and gas lines, extending through openings within the wood studs of a building from accidental puncture by nails and other types of fasteners (e.g. screws). Nail plates may be various sizes (e.g. 5×2 inches, 3×1.5 inches, 2.5×1.5 inches, etc.) and are typically constructed of metal hard enough to prevent passage of a nail being hammered. Nail plates are attached to the wood frame with adhesive, clips or by spikes extending from the nail plates that are driven into the wood. Nail plates with spikes are sometimes referred to as self-nailing stud guards.

While nail plates are effective in preventing accidental puncture of electrical wiring, water lines, and gas lines extending through wood framing of a building, nail plates can be difficult to install on a ceiling or at upper portions of a wall which often times requiring the installer to use a ladder to secure the nail plate. Using a ladder to install nail plates can be dangerous and time consuming.

SUMMARY

Some of the various embodiments of the present disclosure relate to a nail plate driving devices that can efficiently install nail plates at various heights. Some of the various embodiments of the present disclosure include a first handle having an engaging head removably receives a second handle having a magnet for magnetically connecting to a metal nail plate. In some example embodiments, the second handle is removably and threadably connected to the first handle. In some other example embodiments, the second handle is slidably and rotatably positionable within an open end of the first handle.

There has thus been outlined, rather broadly, some of the embodiments of the present disclosure in order that the detailed description thereof may be better understood, and in order that the present contribution to the art may be better appreciated. There are additional embodiments of that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

A. Overview

Some of the various embodiments of the present disclosure relate to a nail plate 10 driving device that can efficiently install nail plates 10. Some of the various embodiments of the present disclosure include a first handle 20 having an engaging head 30 removably receives a second handle 40 having a magnet 50 for magnetically connecting to a metal nail plate 10. In some example embodiments, the second handle 40 is removably and threadably connected to the first handle 20. In some other example embodiments, the second handle 40 is slidably and rotatably positionable within an open end 22 of the first handle 20.

B. First Handle

The first handle 20 has a first end and a second end. The first handle 20 may be comprised of a tube having a lumen wherein the second end of the first handle 20 may include an opening connected to the lumen to slidably and removably receive the second handle 40. The opening within the second end of the first handle 20 may be concentric with the lumen of the first handle 20. The first handle 20 may be comprised of various types of rigid materials such as, but not limited to, metal, plastic and composite materials.

The length of the first handle 20 may vary from 12 inches to over 24 inches. In one example embodiment, the length of the first handle 20 is approximately 26 inches to provide an extended length for striking a nail plate 10 positioned at a height above the user without having to use a ladder.

C. Engaging Head

Figure 10A:
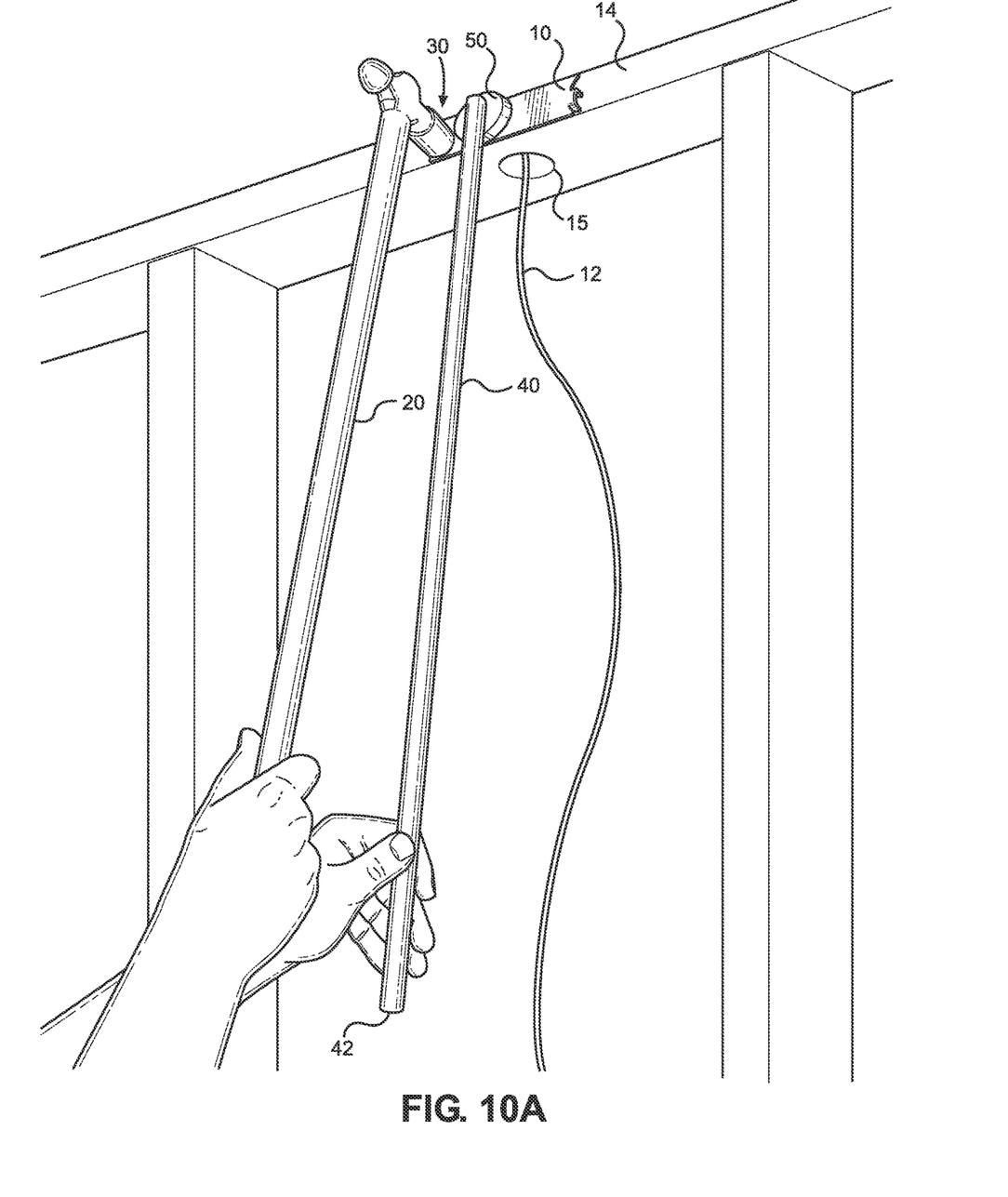
FIG. 10A is a perspective view of the nail plate driving device being used to both retain a nail plate in a desired location and strike the nail plate to drive into the wood.
Figures 10B, 11:
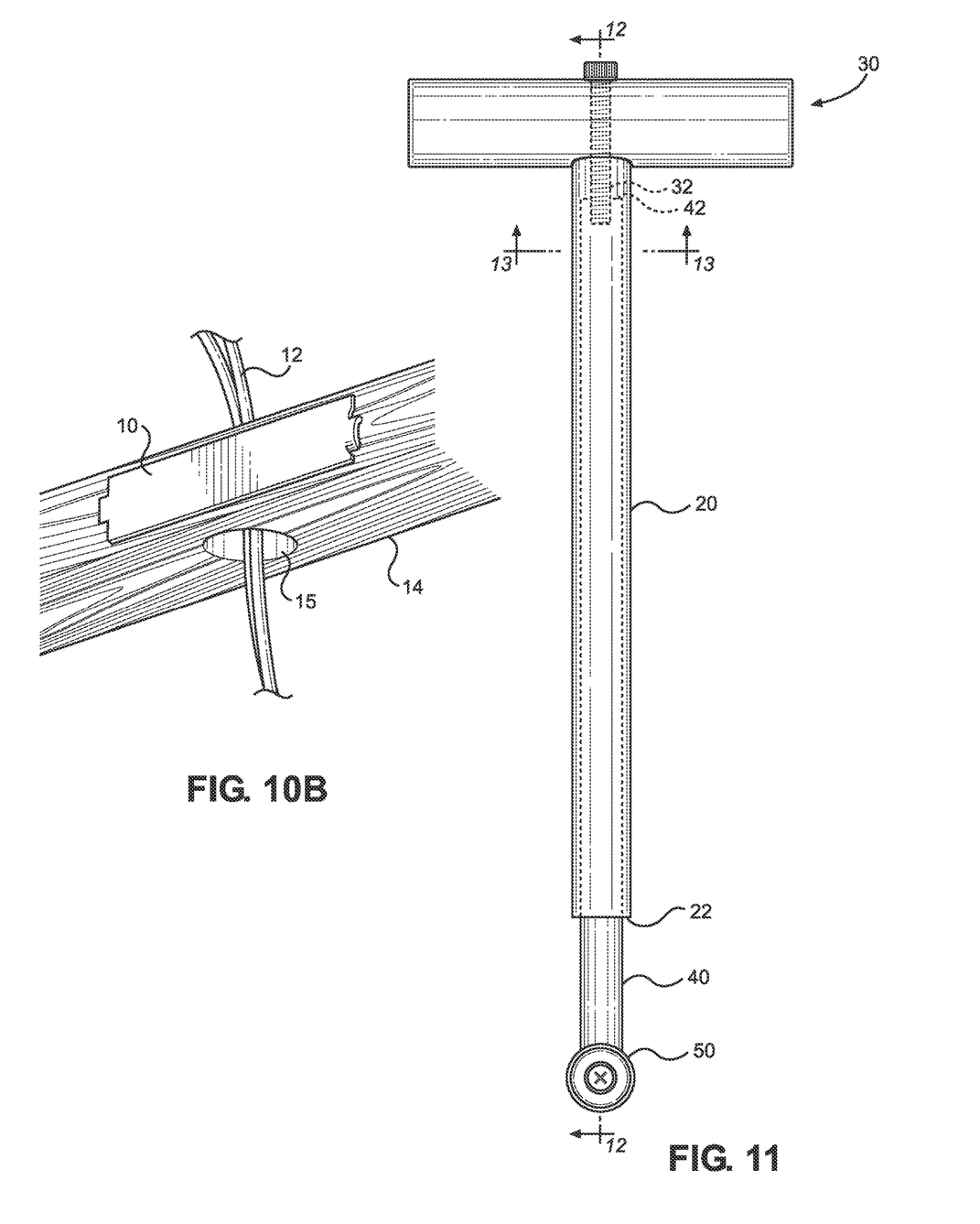
FIG. 10B is a magnified perspective view of FIG. 10A.
FIG. 11 is a side view of another embodiment of the nail plate driving device.
Figure 12:
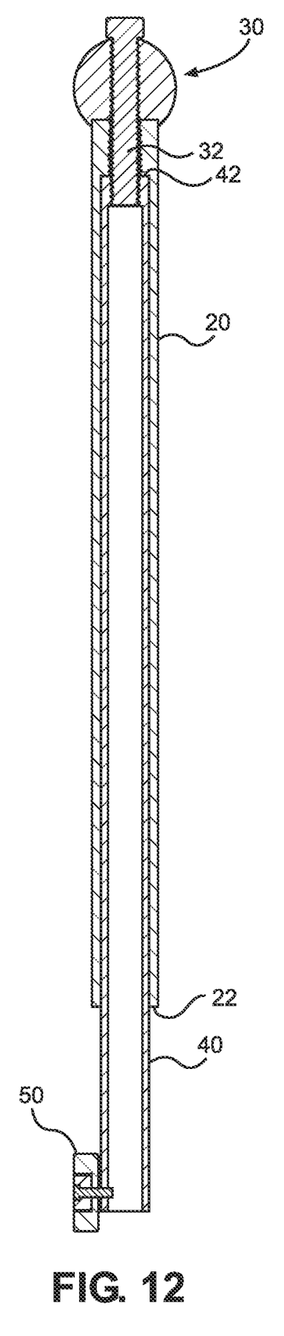
FIG. 12 is a cross sectional view taken along line 12-12 of FIG. 11.
Figure 13:
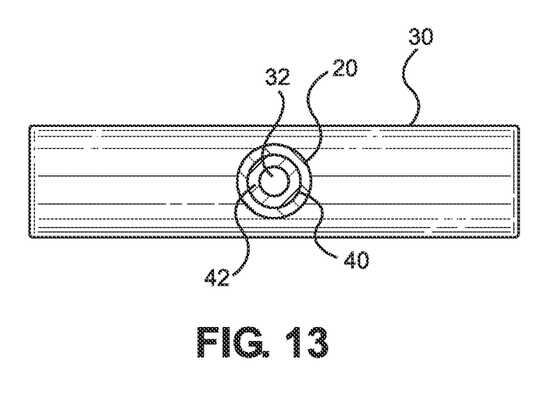
FIG. 13 is a cross sectional view taken along line 13-13 of FIG. 11.

An engaging head 30 is connected to the first end of the first handle 20 as shown in FIGS. 1, 2, 3, 7, 8, 11, 12, and 13 of the drawings. The engaging head 30 is configured for striking a nail plate 10 to drive a plurality of spikes of the nail plate 10 into a wood member 14. FIGS. 1, 2, 3, 7 and 8 illustrate an example embodiment for the engaging head 30 having a ball peen head. FIGS. 11, 12, and 13 illustrate another example embodiment with the engaging head 30 having a cylindrical structure with opposing engaging ends. The engaging head 30 is preferably comprised of a metal material but may be comprised of other types of materials.

In one example embodiment, the engaging head 30 may be permanently attached to the first end of the first handle 20 in a non-removable manner (e.g. welded to the first end of the first handle 20; integrally formed with the first handle 20, etc.). In another example embodiment shown in FIGS. 11 through 13, the engaging head 30 may be removably attached to the first end of the first handle 20 by a threaded member 32 (e.g. threaded fastener such as a bolt) or other securing device.

D. Second Handle

The second handle 40 has a first end and a second end. The second handle 40 may be comprised of a tubular or solid structure. The second handle 40 may be comprised of various types of rigid materials such as, but not limited to, metal, plastic and composite materials.

Figure 1:
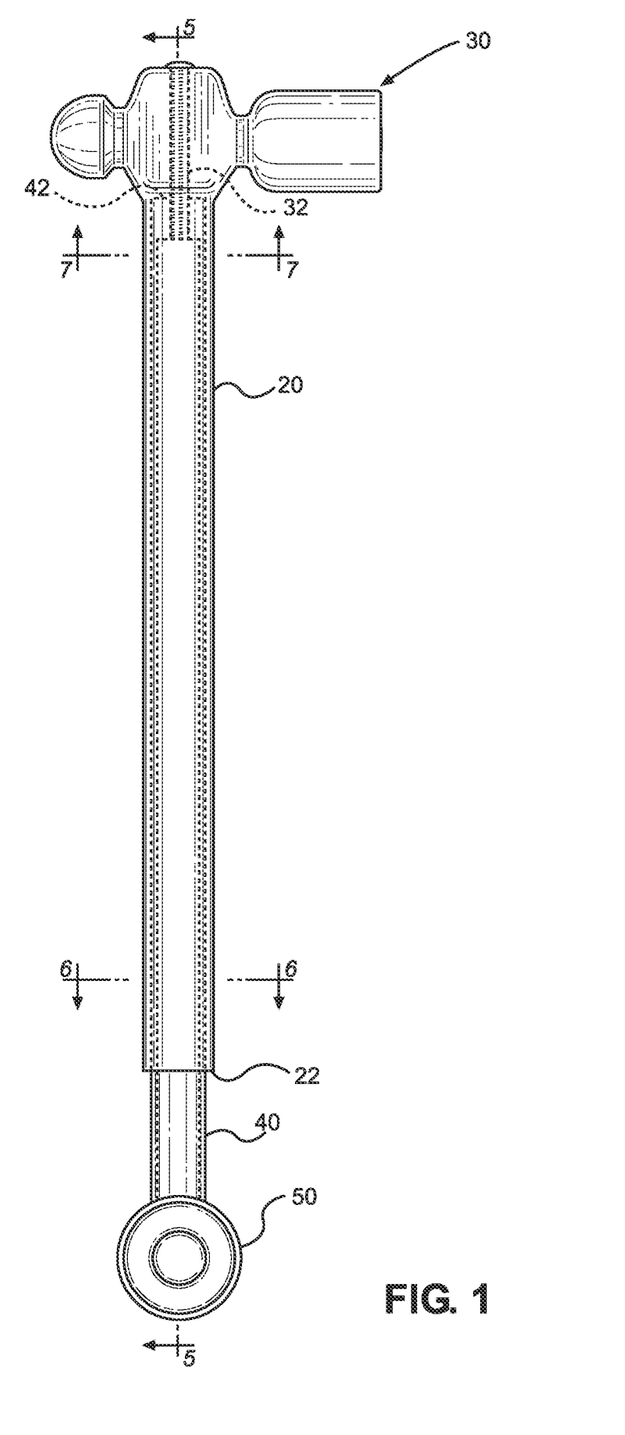
FIG. 1 is a side view of a nail plate driving device in accordance with an example embodiment.
Figure 2:
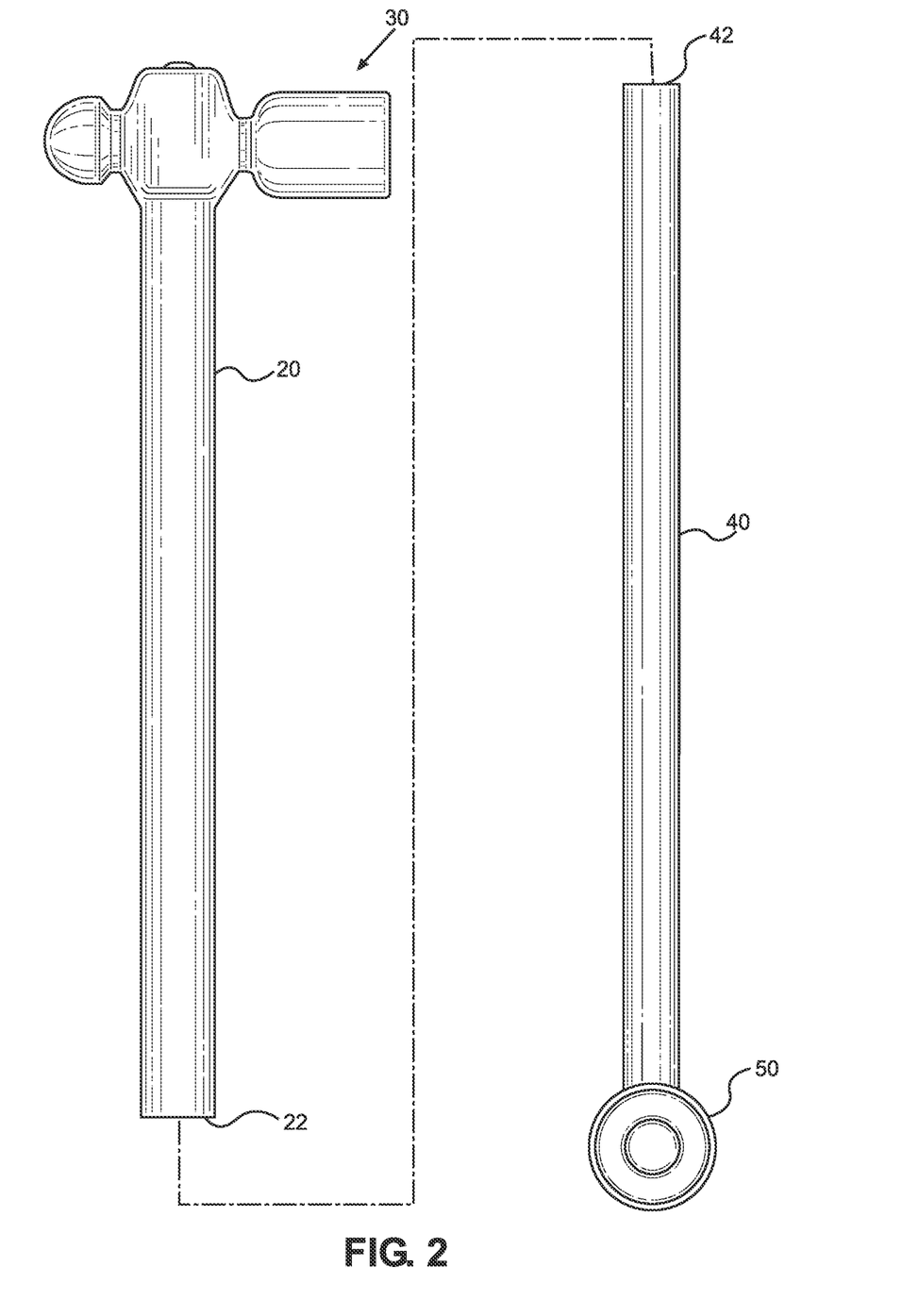
FIG. 2 is a side view of the secondary handle removed from the main handle in accordance with an example embodiment.
Figure 3:
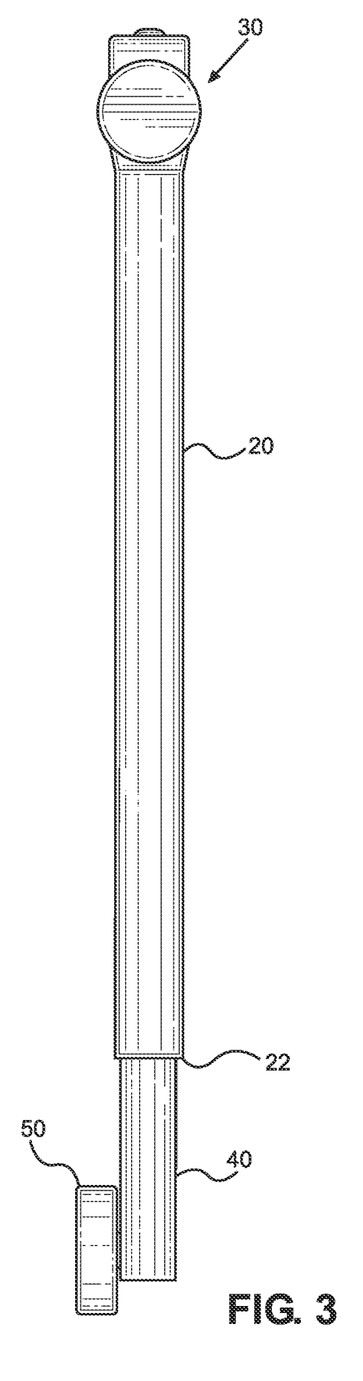
FIG. 3 is a front view of the nail plate driving device in accordance with an example embodiment.
Figure 4:
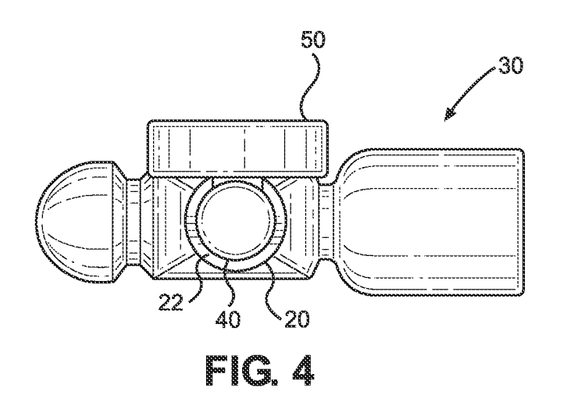
FIG. 4 is a bottom end view of the nail plate driving device in accordance with an example embodiment.
Figure 5:
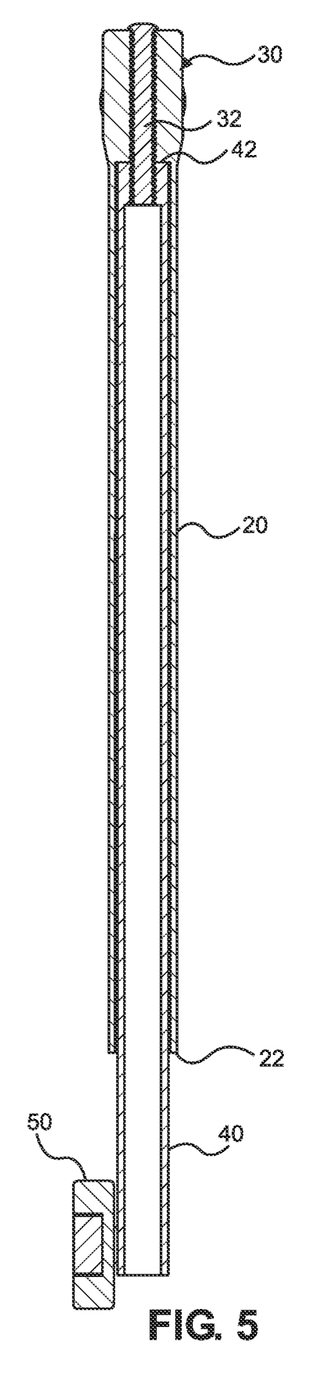
FIG. 5 is a cross sectional view taken along line 5-5 of FIG. 1.
Figure 6:
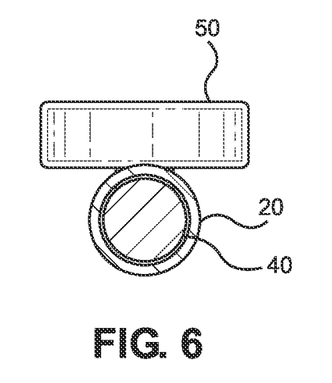
FIG. 6 is a cross sectional view taken along line 6-6 of FIG. 1.
Figure 7:
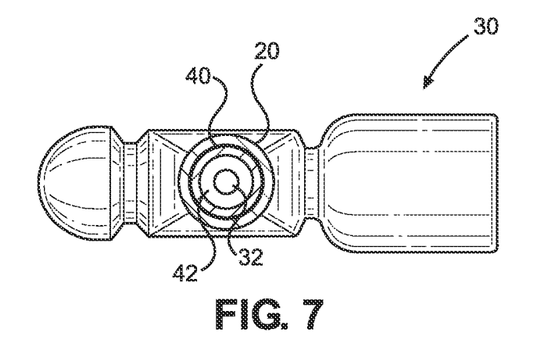
FIG. 7 is a cross sectional view taken along line 7-7 of FIG. 1.
Figure 8:
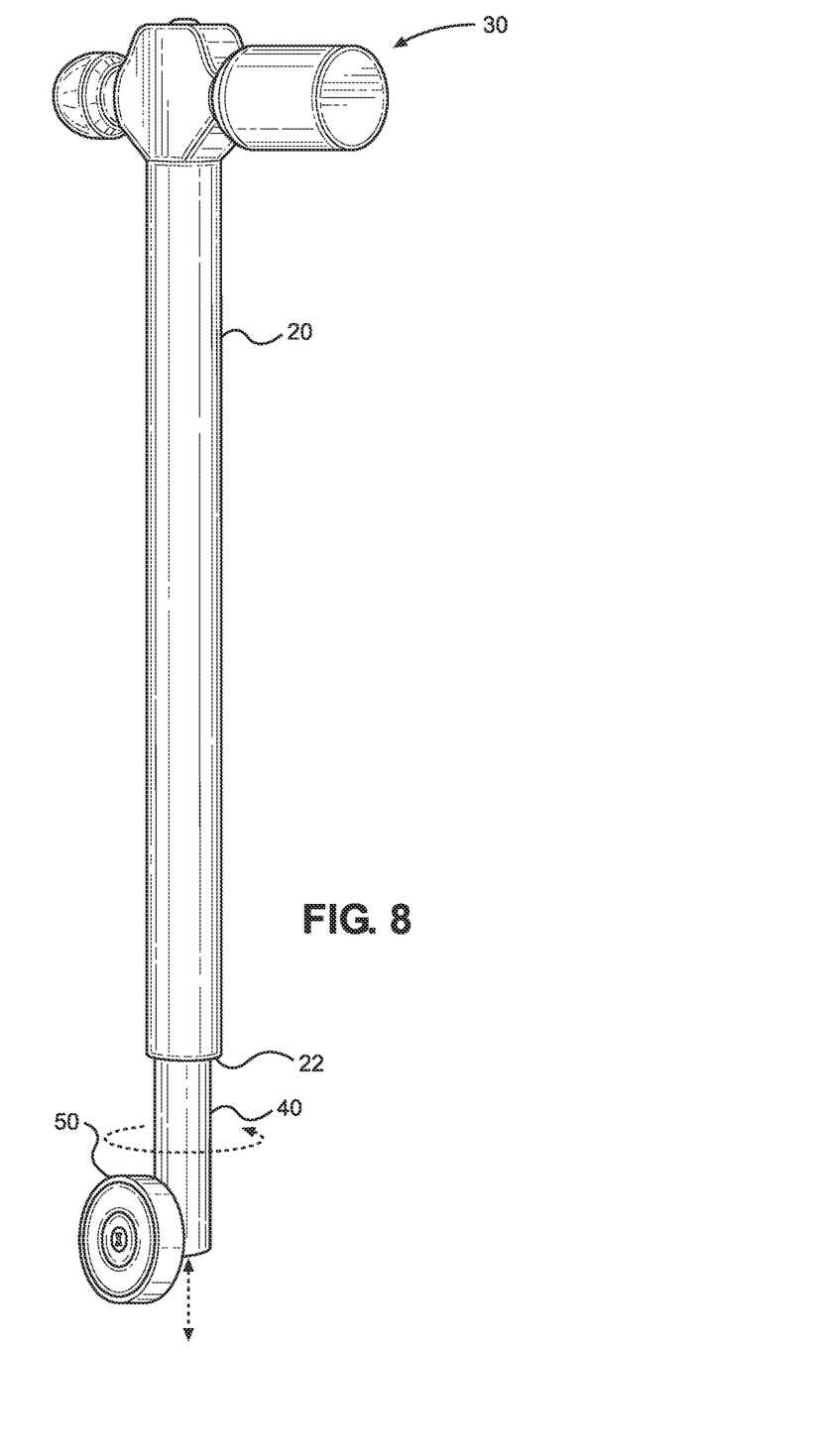
FIG. 8 is a perspective view of the nail plate driving device in accordance with an example embodiment.
Figure 9:
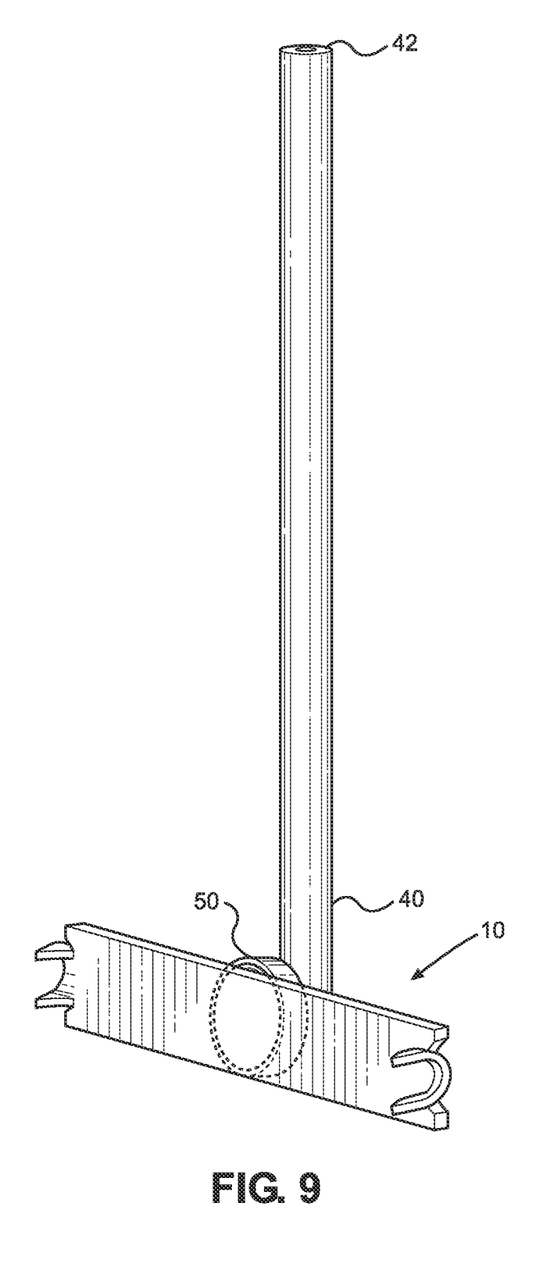
FIG. 9 is a perspective view of the nail plate driving device magnetically retaining a nail plate in accordance with an example embodiment.

In one example embodiment, the second handle 40 is removably, rotatably and/or slidably positioned within the lumen of the first handle 20. In another embodiment the second handle 40b is removably, rotatably and/or slidably positionable over the exterior of the first handle 20. In another embodiment, the second handle 40 is concentric with the first handle 20 when the second handle 40 is positioned within the lumen of the first handle 20. The second handle 40 has a storage state where the second handle 40 is positioned within the lumen of the first handle 20 (FIGS. 1, 3, 5, 8, 11 and 12) and a removed state where the second handle 40 is removed from the lumen of the first handle 20 (FIGS. 2, 9 and 10A).

The length of the second handle 40 may vary from 12 inches to over 24 inches. In one example embodiment, the length of the second handle 40 is approximately 27 inches to provide an extended length for holding a nail plate 10 at a height above the user without the user having to use a ladder. In another embodiment, the first handle 20 is approximately the same length as the second handle 40.

At least a portion of the second handle 40 is removably positioned within the lumen of the first handle 20 as shown in FIGS. 1, 3, 5, 8, 11 and 12 of the drawings. As further shown in FIGS. 1, 3, 5, 8, 11 and 12 of the drawings, the example embodiment shows the second handle 40 extending outwardly from the first handle 20 a distance with the magnet 50 exposed outside of the first handle 20. In one embodiment, the second handle 40 has an outer diameter that is slightly smaller than the diameter of the lumen of the first handle 20. The first handle 20 and the second handle 40 both preferably have a circular cross sectional shape to allow for rotation of the second handle 40 within the lumen of the first handle 20, however, the first handle 20 and the second handle 40 may have non-circular shapes.

E. Magnet

At least one magnet 50 is attached to the second handle 40 near second end of the second handle 40 as shown in FIGS. 1, 2, 3, 5, 6, 8, 11, and 12 of the drawings. The magnet 50 is configured to magnetically connect to the metal nail plate 10 with the magnet 50 having a magnetic field strong enough to engage the metal nail plate 10 with limited movement of the metal nail plate 10 while being magnetically and physically connected to the magnet 50. The magnet 50 may be circular shaped or have various other types of shapes.

The magnet 50 may be attached to a side of the second handle 40 near the second end of the second handle 40 or to the second end of the second handle 40. The magnet 50 may secured to the second handle 40 by a threaded fastener or other type of fastener. In one example embodiment, a portion of the magnet 50 extends past the second end of the second handle 40 as best illustrated in FIGS. 2, 3, 5 and 12 of the drawings. In an embodiment shown in FIGS. 2, 3, 5 and 12 of the drawings, the second end of the second handle 40 and the magnet 50 extend outwardly from the second end of the first handle 20 when the second handle 40 is in the storage state with respect to the first handle 20.

F. Handle Connectors

In one example embodiment, the second handle 40 removably connects to the first handle 20 in a concentric manner with the second handle 40 at least partially positioned within the lumen of the first handle 20. In another example embodiment, the first handle 20 includes a first connector near the first end of the first handle 20 and the second handle 40 includes a second connector near the first end of the second handle 40 where the first connector and the second connector selectively connect together to secure the second handle 40 within the first handle 20 in the storage position. In the example embodiment, the user may secure the second handle 40 to the first handle 20 by securing the second connector to the first connector.

In the various embodiments, the first connector and the second connector may be comprised of any type of connector structure capable of being removably connected to one another (e.g. snap connectors, threaded connectors, clip connectors, friction connectors, detent connectors, etc.). The first connector may be a female connector or male connector. The second connector may be a female connector or male connector. The connectors are preferably comprised of a connector structure capable of retaining the second handle 40 inside of the first handle 20 during transport (e.g. when the first handle 20 is vertically attached to a tool belt of a user the second handle 40 will not accidentally fall out of the first handle 20 while the user walks around and performs work tasks).

For example, the first connector may be comprised of a threaded member 32 (e.g. threaded bolt, etc.) extending from the engaging head 30 or the first end of the first handle 20 as best illustrated in FIGS. 1, 5, 7, 11 and 12 of the drawings. The threaded member 32 may extend concentrically through the lumen. In addition, the second end of the second handle 40 may be comprised of a threaded end 42 (e.g. threaded female opening) that threadably connects to the threaded member 32 to selectively secure the second handle 40 with the first handle 20 by the user rotating the handles 20, 40 with respect to one another as shown in FIG. 8 of the drawings. When the handles 20, 40 are threadably connected to one another in the storage position, the second handle 40 is prevented from sliding out of the lumen of the first handle 20. When the handles 20, 40 are released from threaded connection the second handle 40 may be slid out of the first handle 20 for use separate from the first handle 20. It can be appreciated for the threaded embodiment discussed previously that the threaded member 32 may be attached to the first end of the second handle 40 and the first handle 20 has a threaded aperture that threadably receives the threaded member 32.

In another embodiment, the threaded member 32 may be used to secure the engaging head 30 to the first end of the first handle 20 as shown in FIGS. 11 and 12 of the drawings. The threaded member 32 extends through an aperture of the engaging head 30 and is threadably connected to a threaded aperture within the first end of the first handle 20. In the example embodiment, the threaded member 32 extends through the threaded aperture into the lumen of the first handle 20 where the threaded end 42 of the second handle 40 may threadably engage the threaded member 32 as shown in FIG. 12 of the drawings.

G. Operation of Preferred Embodiment

In use of the preferred embodiment, the user secures the second handle 40 within the first handle 20 and is able to transport the system from location to location while they work (e.g. on their tool belt). When one or more nail plates 10 are to be installed at a significant height such as 7 feet or higher (or near the floor), the user rotates the second handle 40 to release the second handle 40 from the first handle 20. Once the second handle 40 is released, the user pulls the second handle 40 out of the lumen of the first handle 20 and then positions the metal nail plate 10 on the magnet 50 as shown in FIG. 9 of the drawings. The user then grasps the second handle 40 and positions the nail plate 10 attached to the magnet 50 to a desired location on the wood member 14 (e.g. in front of a passage 15 extending through the wood member 14 with electrical wiring 12 as shown in FIG. 10A of the drawings). The user then grasps the first handle 20 and strikes the metal nail plate 10 with the engaging head 30 while concurrently holding the nail plate 10 in the desired location on the wood member 14 as shown in FIG. 10A. The user strikes both ends of the nail plate 10 to drive the metal spikes of the metal nail plate 10 into the wood member 14 and then the user removes the magnet 50 from the metal nail plate 10 by pull the second handle 40 away from the nail plate 10. The user then may repeat the above process to install additional nail plates 10 within the build. When the user is finished using the system to secure nail plates 10 to the wood members 14, the user then slides the second handle 40 back into the lumen of the first handle 20 and then rotates the second handle 40 to threadably connect the second handle 40 to the first handle 20 to prevent the second handle 40 from accidentally be removed from the first handle 20 as shown in FIG. 8 of the drawings.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. A nail plate installation system, comprising:
 a first handle having a first end and a second end, wherein the first handle is comprised of a tube having a lumen, and wherein the second end of the first handle includes an opening connected to the lumen;
 an engaging head connected to the first end of the first handle, wherein the engaging head is configured for striking a nail plate to drive a plurality of spikes of the nail plate into a wood member;
 a second handle having a first end and a second end, wherein the second handle is removably and slidably positioned within the lumen of the first handle, wherein the second handle has a storage state where the second handle is positioned within the lumen of the first handle, and wherein the second handle has a removed state where the second handle is removed from the lumen of the first handle; and
 a magnet attached to the second handle near second end of the second handle, wherein the magnet is configured to magnetically connect to the nail plate, wherein the magnet is attached to a side of the second handle near the second end of the second handle.

2. The nail plate installation system of claim 1, wherein the magnet is secured to the second handle by a threaded fastener.

3. The nail plate installation system of claim 1, wherein a portion of the magnet extends past the second end of the second handle.

4. The nail plate installation system of claim 1, wherein the magnet is circular shaped.

5. The nail plate installation system of claim 1, wherein the opening within the second end of the first handle is concentric with the lumen of the first handle.

6. The nail plate installation system of claim 1, wherein the second handle is concentric with the first handle when the second handle is positioned within the lumen of the first handle.

7. The nail plate installation system of claim 1, wherein a length of the first handle is approximately the same as a length of the second handle.

8. The nail plate installation system of claim 1, wherein the second end of the second handle and the magnet extend outwardly from the second end of the first handle when in the storage state.

9. The nail plate installation system of claim 1, wherein the engaging head is permanently attached to the first end of the first handle.

10. A nail plate installation system, comprising:
 a first handle having a first end and a second end, wherein the first handle is comprised of a tube having a lumen, and wherein the second end of the first handle includes an opening connected to the lumen;
 an engaging head connected to the first end of the first handle, wherein the engaging head is configured for striking a nail plate to drive a plurality of spikes of the nail plate into a wood member;
 a threaded member extending from the engaging head or the first end of the first handle, wherein the threaded member extends concentrically through the lumen;
 a second handle having a first end and a second end, wherein the second handle is removably, rotatably and slidably positioned within the lumen of the first handle, wherein the second end of the second handle is comprised of a threaded end that threadably connects to the threaded member to selectively secure the second handle with the first handle, wherein the second handle has a storage state where the second handle is positioned within the lumen of the first handle, and wherein the second handle has a removed state where the second handle is removed from the lumen of the first handle; and a magnet attached to the second handle near second end of the second handle, wherein the magnet is configured to magnetically connect to the nail plate.

11. The nail plate installation system of claim 10, wherein the magnet is attached to a side of the second handle near the second end of the second handle.

12. The nail plate installation system of claim 10, wherein the magnet is secured to the second handle by a threaded fastener.

13. The nail plate installation system of claim 10, wherein a portion of the magnet extends past the second end of the second handle.

14. The nail plate installation system of claim 10, wherein the magnet is circular shaped.

15. The nail plate installation system of claim 10, wherein the opening within the second end of the first handle is concentric with the lumen of the first handle.

16. The nail plate installation system of claim 10, wherein the second handle is concentric with the first handle when the second handle is positioned within the lumen of the first handle.

17. The nail plate installation system of claim 10, wherein a length of the first handle is approximately the same as a length of the second handle.

18. The nail plate installation system of claim 10, wherein the second end of the second handle and the magnet extend outwardly from the second end of the first handle when in the storage state.

19. A nail plate installation system, comprising:

a first handle having a first end and a second end, wherein the first handle is comprised of a tube having a lumen, wherein the second end of the first handle includes an opening connected to the lumen, and wherein the opening within the second end of the first handle is concentric with the lumen of the first handle;

an engaging head connected to the first end of the first handle, wherein the engaging head is configured for striking a nail plate to drive a plurality of spikes of the nail plate into a wood member;

a threaded member extending from the engaging head or the first end of the first handle, wherein the threaded member extends concentrically through the lumen;

a second handle having a first end and a second end, wherein the second handle is removably, rotatably and slidably positioned within the lumen of the first handle, wherein the second end of the second handle is comprised of a threaded end that threadably connects to the threaded member to selectively secure the second handle with the first handle, wherein the second handle has a storage state where the second handle is positioned within the lumen of the first handle, and wherein the second handle has a removed state where the second handle is removed from the lumen of the first handle; and a magnet attached to the second handle near second end of the second handle, wherein the magnet is configured to magnetically connect to the nail plate, wherein the magnet is attached to a side of the second handle near the second end of the second handle, wherein the magnet is secured to the second handle by a threaded fastener, wherein a portion of the magnet extends past the second end of the second handle, and wherein the magnet is circular shaped;

wherein the second handle is concentric with the first handle when the second handle is positioned within the lumen of the first handle;

wherein the second end of the second handle and the magnet extend outwardly from the second end of the first handle when in the storage state.

20. A nail plate installation system, comprising:

a first handle having a first end and a second end, wherein the first handle is comprised of a tube having a lumen, and wherein the second end of the first handle includes an opening connected to the lumen;

an engaging head connected to the first end of the first handle, wherein the engaging head is configured for striking a nail plate to drive a plurality of spikes of the nail plate into a wood member;

a second handle having a first end and a second end, wherein the second handle is removably and slidably positioned within the lumen of the first handle, wherein the second handle has a storage state where the second handle is positioned within the lumen of the first handle, and wherein the second handle has a removed state where the second handle is removed from the lumen of the first handle; and a magnet attached to the second handle near second end of the second handle, wherein the magnet is configured to magnetically connect to the nail plate;

wherein the second end of the second handle and the magnet extend outwardly from the second end of the first handle when in the storage state.

21. The nail plate installation system of claim 20, wherein a portion of the magnet extends past the second end of the second handle.

22. The nail plate installation system of claim 20, wherein the magnet is circular shaped.

23. The nail plate installation system of claim 20, wherein the opening within the second end of the first handle is concentric with the lumen of the first handle.

24. The nail plate installation system of claim 20, wherein the second handle is concentric with the first handle when the second handle is positioned within the lumen of the first handle.

25. The nail plate installation system of claim 20, wherein a length of the first handle is approximately the same as a length of the second handle.

26. The nail plate installation system of claim 20, wherein the engaging head is permanently attached to the first end of the first handle.

27. A nail plate installation system, comprising:

a first handle having a first end and a second end, wherein the first handle is comprised of a tube having a lumen, and wherein the second end of the first handle includes an opening connected to the lumen;

an engaging head connected to the first end of the first handle, wherein the engaging head is configured for striking a nail plate to drive a plurality of spikes of the nail plate into a wood member;

a second handle having a first end and a second end, wherein the second handle is removably and slidably positioned within the lumen of the first handle, wherein the second handle has a storage state where the second handle is positioned within the lumen of the first handle, and wherein the second handle has a removed state where the second handle is removed from the lumen of the first handle; and a magnet attached to the second handle near second end of the second handle, wherein the magnet is configured to magnetically connect to the nail plate, and wherein a portion of the magnet extends past the second end of the second handle.

\* \* \* \* \*